(No Model.)
M. L. SCIVALLEY.
WAGON JACK.
No. 358,485. Patented Mar. 1, 1887.
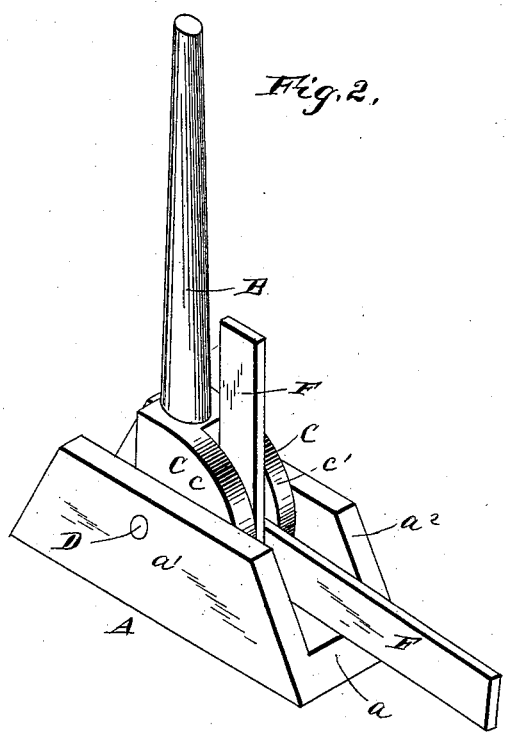
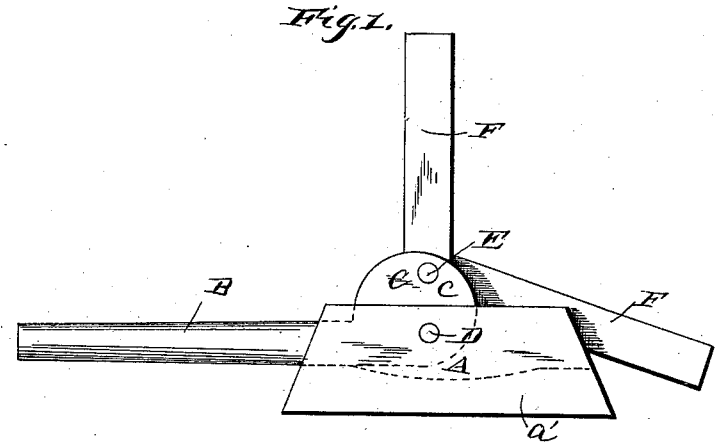
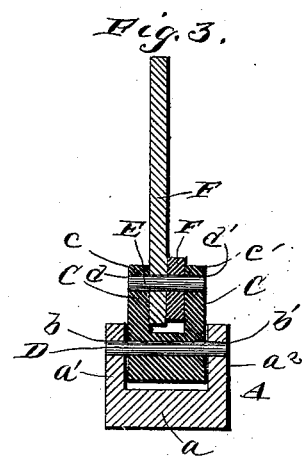
Witnesses
Chas. L. Taylor
Inventor
M. L. Scivalley
By his Attorneys
C. A. Knowles

UNITED STATES PATENT OFFICE.

MARTIN LUTHER SCIVALLEY, OF COWAN, TENNESSEE.

WAGON-JACK.

SPECIFICATION forming part of Letters Patent No. 358,485, dated March 1, 1887.

Application filed September 23, 1886. Serial No. 214,361. (No model.)

*To all whom it may concern:*

Be it known that I, MARTIN LUTHER SCIVALLEY, a citizen of the United States, residing at Cowan, in the county of Franklin and State of Tennessee, have invented a new and useful Improvement in Wagon-Jacks, of which the following is a specification.

My invention relates to improvements in lifting-jacks, or, as they are commonly termed, "wagon-jacks;" and it consists of the construction, arrangement, and adaptation of parts for service, substantially as hereinafter described, and specifically pointed out in the claims.

The object of my invention is the provision of a wagon-jack adapted to raise or lift vehicles of very heavy weight with ease.

A further object is to provide a wagon-jack which shall combine extreme simplicity of construction with thorough efficiency in operation, and one which shall be strong and durable and cheap of manufacture.

In order that my invention may be fully understood and the advantages attained by my improvements appreciated, I have illustrated a wagon-jack constructed in accordance with and embodying the features of my invention in the accompanying drawings, in which—

Figure 1 is a side elevation of my wagon-jack in the position assumed when supporting the axle of a vehicle. Fig. 2 is a perspective view, and Fig. 3 is a transverse sectional view.

Referring to the drawings, in which similar letters of reference denote corresponding parts in the several figures, A designates the base or support of my improved wagon-jack, comprising the bottom wall, $a$, and the side walls, $a'$ and $a^2$. In these side walls, $a'$ and $a^2$, at a suitable point, are provided aligned openings $b$ and $b'$, for the purpose presently to be explained.

B designates a lever having at its inner end a cam or eccentric, C, which is fulcrumed between the side walls, $a'$ and $a^2$, by a pin or bolt, D, passing through the cam or eccentric C and bearing in the openings $b$ and $b'$. The said cam or eccentric C is bifurcated or formed with arms $c$ and $c'$, provided with aligned openings $d$ and $d'$, to receive a pin, bolt, or pivot, E, carrying the lifting and supporting arms F. In this case I have only shown two of the said arms F; but it will be understood that any number may be employed, as desired.

This being the construction of my wagon-jack, the operation of the same is as follows: One of the elevating and supporting arms F is raised and placed under the axle of the vehicle, the jack being in the position shown in Fig. 2, with the lever B up parallel with the supporting-arm F. The lever B is then lowered, causing the cam C to elevate arms F, as shown in Fig. 2, thereby raising the axle from the ground, as will be readily understood. The axle can be raised to any desired height by the arms F, as they are of different lengths, and different heights of axles may also be accommodated.

From the foregoing description, taken in connection with the drawings, it will be readily observed that I provide a lifting-jack employing a lever of the first class, and that by so doing it is made very powerful, enabling very heavy weights to be lifted with great ease and without undue strain upon the parts. It will thus be seen that I have combined all the requisites desired in this class of devices, whereby it commends itself to all who wish a practical and efficient wagon or lifting jack.

I claim—

1. In combination with the base or support A, the lever B, having cam C fulcrumed to the base, and a series of independently-pivoted elevating and supporting arms, F, connected to the cam, said arms F being of different lengths, for the purpose set forth.

2. In a wagon-jack, in combination with the elevating device or lever, the series of independently-pivoted supporting-arms F, of different lengths, connected to and elevated by the said device or lever, as set forth.

3. The base A, having the side walls, $a'$ $a^2$, in combination with the cam-lever pivoted or fulcrumed between the side walls, the cam C or eccentric being bifurcated, and supporting and elevating arms F, of different lengths, pivoted side by side in the bifurcated portion of the cam C, substantially as described.

In testimony that I claim the foregoing as my own I have hereto affixed my signature in presence of two witnesses.

MARTIN LUTHER SCIVALLEY.

Witnesses:
A. J. SKIDMORE,
R. F. OAKLEY.